US008868828B2

(12) United States Patent
Bakke et al.

(10) Patent No.: US 8,868,828 B2
(45) Date of Patent: Oct. 21, 2014

(54) IMPLEMENTING STORAGE ADAPTER PERFORMANCE OPTIMIZATION WITH CACHE DATA/DIRECTORY MIRRORING

(75) Inventors: Brian E. Bakke, Rochester, MN (US); Brian L. Bowles, Rochester, MN (US); Michael J. Carnevale, Rochester, MN (US); Robert E. Galbraith, II, Rochester, MN (US); Adrian C. Gerhard, Rochester, MN (US); Murali N. Iyer, Rochester, MN (US); Daniel F. Moertl, Rochester, MN (US); Mark J. Moran, Minneapolis, MN (US); Gowrisankar Radhakrishnan, Rochester, MN (US); Rick A. Weckwerth, Oronoco, MN (US); Donald J. Ziebarth, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 13/114,185

(22) Filed: May 24, 2011

(65) Prior Publication Data

US 2012/0303883 A1 Nov. 29, 2012

(51) Int. Cl.
*G06F 12/00* (2006.01)
*G06F 12/08* (2006.01)

(52) U.S. Cl.
CPC .............. *G06F 12/00* (2013.01); *G06F 12/08* (2013.01)
USPC ............ 711/105; 711/120; 711/141; 711/162

(58) Field of Classification Search
CPC . G06F 12/00; G06F 12/0831; G06F 13/4022; G06F 11/1004; G06F 11/0727; G06F 11/0793; G06F 3/061; G06F 3/0658; G06F 3/0659; G06F 3/0689; G06F 9/30032; G06F 9/3004; G06F 9/3877; G06F 9/3834; G06F 9/3838; G06F 9/30087
USPC ........................................................ 711/105
See application file for complete search history.

(56) References Cited

U.S. PATENT DOCUMENTS 6,243,735 B1 * 6/2001 Imanishi et al. .............. 718/102
6,324,599 B1 11/2001 Zhou et al.
(Continued)

OTHER PUBLICATIONS

IBM; "ServeRAID B5015 SSD Controller is an Enterprise-grade RAID adapter offering the highest peformance and data protection optimized for next generation SSDs"; IBM Hardware announcement 110-113; May 18, 2010.

(Continued)

*Primary Examiner* — Reginald Bragdon
*Assistant Examiner* — Hannah A Faye-Joyner
(74) *Attorney, Agent, or Firm* — Joan Pennington

(57) ABSTRACT

A method and controller for implementing storage adapter performance optimization with cache data and cache directory mirroring between dual adapters minimizing firmware operations, and a design structure on which the subject controller circuit resides are provided. One of the first controller or the second controller operates in a first initiator mode includes firmware to set up an initiator write operation building a data frame for transferring data and a respective cache line (CL) for each page index to the other controller operating in a second target mode. Respective initiator hardware engines transfers data, reading CLs from an initiator control store, and writing updated CLs to an initiator data store, and simultaneously sends data and updated CLs to the other controller. Respective target hardware engines write data and updated CLs to the target data store, eliminating firmware operations of the controller operating in the second target mode.

15 Claims, 12 Drawing Sheets

(56) References Cited

U.S. PATENT DOCUMENTS

| | | | |
|---|---|---|---|
| 6,460,122 B1 * | 10/2002 | Otterness et al. | 711/154 |
| 6,473,837 B1 | 10/2002 | Hughes et al. | |
| 6,549,990 B2 | 4/2003 | Hughes et al. | |
| 6,684,270 B1 | 1/2004 | Chmara et al. | |
| 6,751,720 B2 * | 6/2004 | Barroso et al. | 711/210 |
| 7,609,121 B2 * | 10/2009 | Feng et al. | 331/177 V |
| 7,680,968 B2 | 3/2010 | Burton | |
| 7,844,752 B2 * | 11/2010 | Mirabeau et al. | 710/22 |
| 8,209,446 B2 * | 6/2012 | Go et al. | 710/22 |
| 8,495,258 B2 | 7/2013 | Bakke et al. | |
| 8,495,259 B2 | 7/2013 | Bakke et al. | |
| 8,516,164 B2 | 8/2013 | Bakke et al. | |
| 8,544,029 B2 | 9/2013 | Bakke et al. | |
| 8,656,213 B2 | 2/2014 | Bakke et al. | |
| 2003/0133405 A1 | 7/2003 | Blorec et al. | |
| 2003/0149909 A1 | 8/2003 | Elko et al. | |
| 2003/0149920 A1 | 8/2003 | Elko et al. | |
| 2003/0188216 A1 | 10/2003 | Elko et al. | |
| 2003/0196016 A1 | 10/2003 | Brooks et al. | |
| 2003/0196025 A1 | 10/2003 | Dahlen et al. | |
| 2003/0196071 A1 | 10/2003 | Elko et al. | |
| 2004/0162926 A1 | 8/2004 | Levy | |
| 2005/0114561 A1 | 5/2005 | Lu et al. | |
| 2006/0136458 A1 | 6/2006 | Elko et al. | |
| 2007/0162637 A1 | 7/2007 | Mirabeau et al. | |
| 2008/0059699 A1 | 3/2008 | Kubo et al. | |
| 2008/0168471 A1 | 7/2008 | Benner et al. | |
| 2008/0244227 A1 * | 10/2008 | Gee et al. | 712/30 |
| 2008/0263307 A1 | 10/2008 | Adachi | |
| 2009/0138627 A1 | 5/2009 | Shah et al. | |
| 2009/0228660 A1 | 9/2009 | Edwards et al. | |
| 2010/0199039 A1 | 8/2010 | Bauman et al. | |
| 2011/0066808 A1 | 3/2011 | Flynn et al. | |
| 2011/0314186 A1 | 12/2011 | Go et al. | |

OTHER PUBLICATIONS

Laing, C.-et. al.; "DS8000 Performance Monitoring and Tuning"; IBM.com/Redbooks; IBM Corporation; Chapters 4-5; pp. 80-85; Mar. 2009.

"Implementing Storage Adapter Performance Optimization With Enhanced Resource Pool Allocation" by Brian E. Bakke et al., U.S. Appl. No. 13/114,427, filed May 24, 2011.

"Implementing Storage Adapter Performance Optimization With Parity Update Footprint Mirroring", by Brian E. Bakke et al., U.S. Appl. No. 13/114,268, filed May 24, 2011.

* cited by examiner

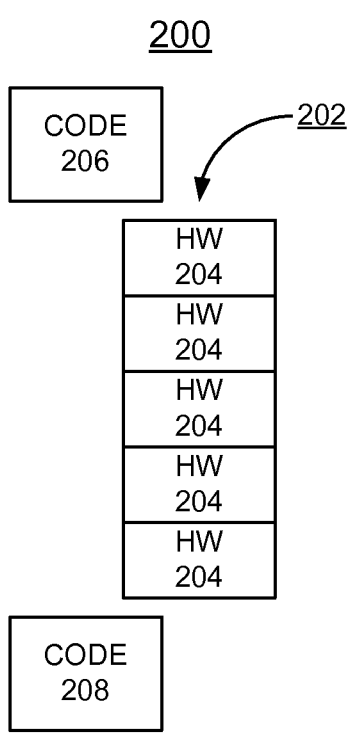
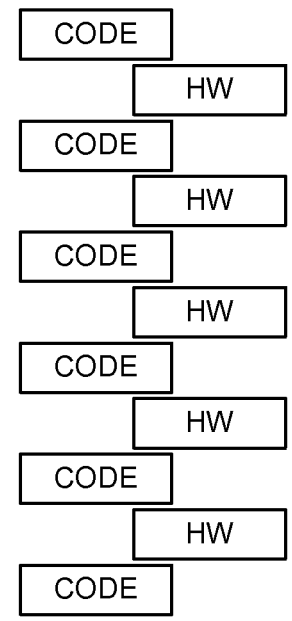
FIG. 2A
FIG. 2B

300

| OFFSET 302 | SIZE 304 | | DEFINITION 306 |
|---|---|---|---|
| 000:03F | 256 B | 64B | RESERVED FOR FIRMWARE |
| 040:07F | | 64B | RESERVED |
| 080:0BF | | 64B | HW CB #1  308 |
| 0C0:0FF | | 64B | HW CB #2  308 |
| 100:13F | 256 B | 64B | HW CB #3  308 |
| 140:17F | | 64B | HW CB #4  308 |
| 180:1BF | | 64B | HW CB #5  308 |
| 1C0:1FF | | 64B | HW CB #6  308 |
| 200:23F | 256 B | 64B | HW CB #7  308 |
| 240:27F | | 64B | HW CB #8  308 |
| 280:2BF | | 64B | HW CB #9  308 |
| 2C0:2FF | | 64B | HW CB #10  308 |
| 300:33F | 256 B | 64B | HW CB #11  308 |
| 340:37F | | 64B | HW CB #12  308 |
| 380:3BF | | 64B | HW CB #13  308 |
| 3C0:3FF | | 64B | HW CB #14  308 |
| 400:43F | 256 B | 64B | HW CB #15  308 |
| 440:47F | | 64B | HW CB #16  308 |
| 480:4BF | | 64B | HW CB #17  308 |
| 4C0:4FF | | 64B | THE FIRST 260-BYTES IS USED AS LIST SPACE FOR 65 INDICES ENOUGH TO COVER A 256K DMA THAT IS NOT ALIGNED. IF LIST SPACE IS ELSEWHERE THEN COULD BE USED FOR HW CB. FW WILL USE THE LAST 60-BYTES OF THIS. |
| 500:5FF | 256 B | | |
| 600:7FF | 512B | | RESERVED. COULD BE LIST SPACE OR HW CB. |

FIG. 3A

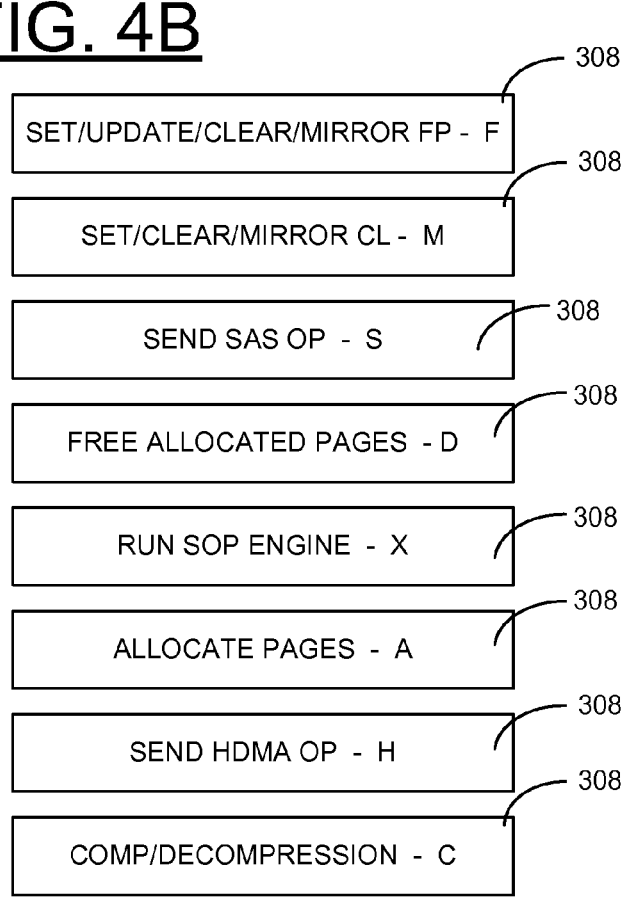

IMPLEMENTING STORAGE ADAPTER PERFORMANCE OPTIMIZATION WITH CACHE DATA/DIRECTORY MIRRORING

FIELD OF THE INVENTION

The present invention relates generally to the data processing field, and more particularly, relates to a method and controller for implementing storage adapter performance optimization with cache data and cache directory mirroring between dual adapters minimizing firmware operations, and a design structure on which the subject controller circuit resides.

DESCRIPTION OF THE RELATED ART

Storage adapters are used to connect a host computer system to peripheral storage I/O devices such as hard disk drives, solid state drives, tape drives, compact disk drives, and the like. Currently various high speed system interconnects are to connect the host computer system to the storage adapter and to connect the storage adapter to the storage I/O devices, such as, Peripheral Component Interconnect Express (PCIe), Serial Attach SCSI (SAS), Fibre Channel, and InfiniBand.

For many years now, hard disk drives (HDDs) or spinning drives have been the dominant storage I/O device used for the persistent storage of computer data which requires online access. Recently, solid state drives (SSDs) have become more popular due to their superior performance. Specifically, SSDs are typically capable of performing more I/Os per seconds (IOPS) than HDDs, even if their maximum data rates are not always higher than HDDs.

From a performance point of view, an ideal storage adapter would never be a performance bottleneck to the system. However, in reality storage adapters are often a performance bottleneck to the computer system. One effect of the increasing popularity of SSDs is that the storage adapter is more often the performance bottleneck in the computer system.

A need exists for an effective method and controller for implementing storage adapter performance optimization. A need exists for such method and controller for use with either HDDs or SSDs and that significantly reduces the time required for an I/O operation, while efficiently and effectively maintaining needed functions of the storage adapter for various arrangements of the storage adapter and the storage I/O devices, such as utilizing Write Caching, and Dual Controllers configurations, and redundant array of inexpensive drives (RAID) read and write operations.

As used in the following description and claims, the terms controller and controller circuit should be broadly understood to include an input/output (IO) adapter (IOA) and includes an IO RAID adapter connecting various arrangements of a host computer system and peripheral storage I/O devices including hard disk drives, solid state drives, tape drives, compact disk drives, and the like.

SUMMARY OF THE INVENTION

Principal aspects of the present invention are to provide a method and controller for implementing storage adapter performance optimization with cache data and cache directory mirroring between dual adapters minimizing firmware operations, and a design structure on which the subject controller circuit resides. Other important aspects of the present invention are to provide such method, controller, and design structure substantially without negative effects and that overcome many of the disadvantages of prior art arrangements.

In brief, a method and controller for implementing storage adapter performance optimization with cache data and cache directory mirroring between dual adapters minimizing firmware operations, and a design structure on which the subject controller circuit resides are provided. Each of a first controller and a second controller includes a plurality of hardware engines, a control store configured to store the cache lines (CLs) for each page index and a data store configured to store data and respective cache line (CL) for each page index. One of the first controller or the second controller operates in a first initiator mode includes firmware to set up an initiator write operation building a data frame for transferring data and a respective cache line (CL) for each page index to the other of the first controller or the second controller operating in a second target mode. Respective initiator hardware engines transfers data, reading CLs from the initiator control store, and writing updated CLs to the initiator data store, and simultaneously sending data and updated CLs to the other of the first controller or the second controller. Respective target hardware engines write data and updated CLs to the target data store, eliminating firmware operations of the first controller or the second controller operating in the second target mode.

In accordance with features of the invention, the cache data and cache directory mirroring between the first controller and second controller involves minimal firmware operation for the controller operating in the first initiator mode, while eliminating firmware operations of the controller operating in the second target mode.

In accordance with features of the invention, the target hardware engines write data and updated CLs to the target data store using the data store index specified in the data frame.

In accordance with features of the invention, the target hardware engines write data and updated CLs to the target data store together with checking a data offset in the data frames to ensure no frames were dropped. If the controller operating in the second target mode detects any error during the mirrored write operation, the controller transmits a check condition to the controller operating in the first initiator mode.

In accordance with features of the invention, the controller operating in the second target mode transmits a response frame at the end of the mirrored write operation. The controller operating in the first initiator mode sets a bit in the data frame to indicate the end of the mirrored write operation.

In accordance with features of the invention, the controller operating in the first initiator mode does not transmit a command frame for the mirrored write operation. The controller operating in the second target mode does not transmit any transfer ready frames.

BRIEF DESCRIPTION OF THE DRAWINGS

The present invention together with the above and other objects and advantages may best be understood from the following detailed description of the preferred embodiments of the invention illustrated in the drawings, wherein:

FIG. 2A illustrates example chained hardware operations minimizing hardware and firmware interactions in accordance with the preferred embodiment;

FIG. 2B illustrates conventional prior art storage adapter hardware and firmware interactions;

FIG. 3A illustrates an example control store (CS) structure including a plurality of sequential control blocks in accordance with the preferred embodiment;

FIG. 4A illustrates an example common header of a control block in accordance with the preferred embodiment;

FIG. 4B illustrates a plurality of example control blocks in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and controller implement enhanced storage adapter performance and performance optimization with chained hardware operations for cache data and cache directory mirroring write and mirroring delete of minimizing firmware use, and a design structure on which the subject controller circuit resides is provided.

Figure 1:
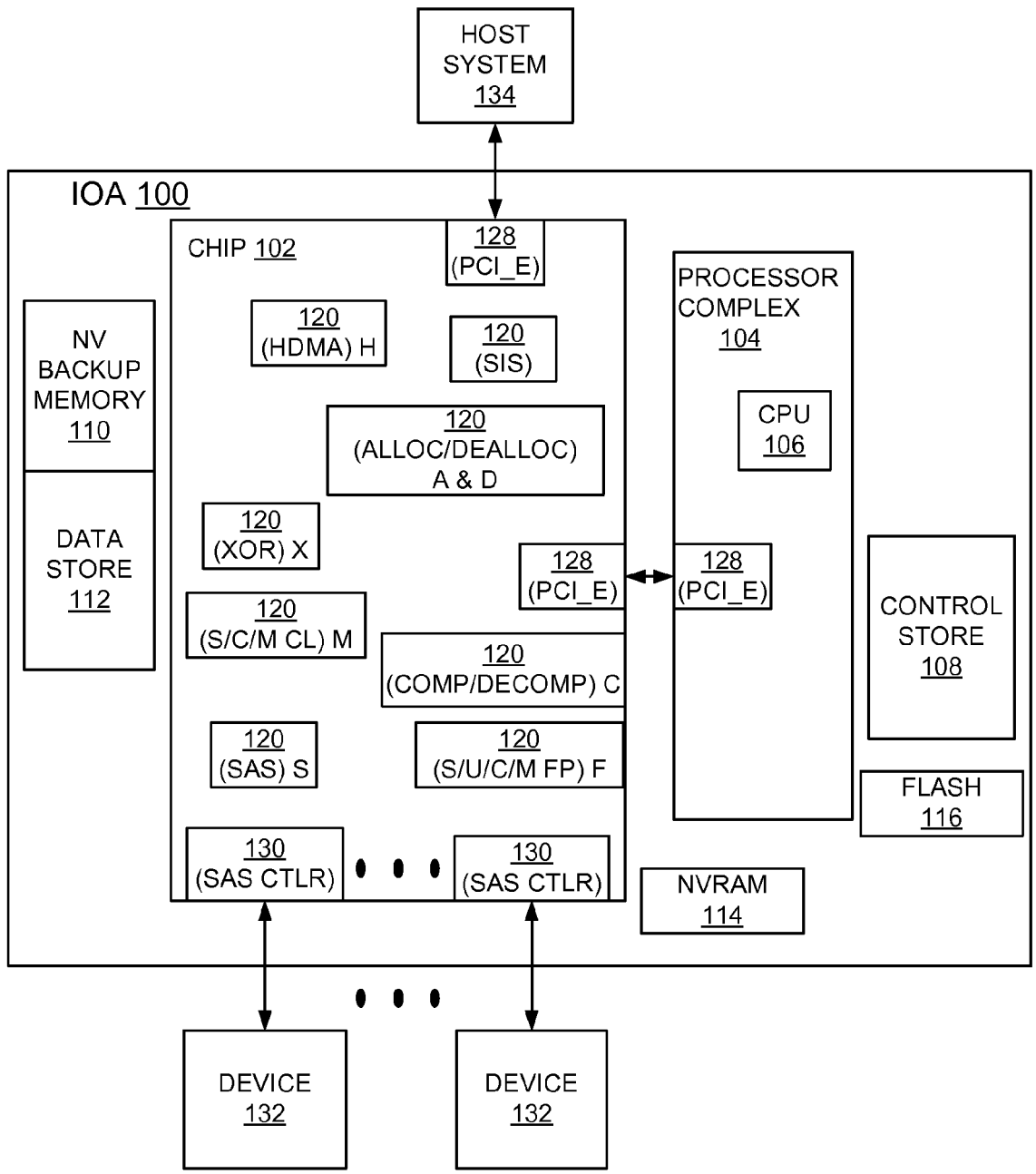
FIG. 1 is a schematic and block diagram illustrating an exemplary system for implementing storage adapter performance optimization with chained hardware operations minimizing hardware and firmware interactions in accordance with the preferred embodiment.

Having reference now to the drawings, in FIG. 1, there is shown an input/output adapter (IOA) or controller in accordance with the preferred embodiment generally designated by the reference character 100. Controller 100 includes a semiconductor chip 102 coupled to at least one processor complex 104 including one or more processors or central processor units (CPUs) 106. Controller 100 includes a control store (CS) 108, such as a dynamic random access memory (DRAM) proximate to the CPU 106 providing control block, work queue and event queue storage. Controller 100 includes a non-volatile (NV) backup memory 110 and a data store (DS) 112 providing data and scratch buffers for control block set up and processing, for example, performed by hardware. Controller 100 includes a non-volatile random access memory (NVRAM) 114, and a flash memory 116.

In accordance with features of the invention, controller 100 implements methods that uniquely chains together hardware operations in order to minimize hardware/firmware interactions in order to maximize performance. The hardware (HW) chaining is completely heterogeneous; asynchronous, not requiring synchronization or defined timed slots for operations; fully free form with any HW engine chained to any HW engine, and operational policy in FW dispatching at HW speeds.

Controller semiconductor chip 102 includes a plurality of hardware engines 120, such as, a hardware direct memory access (HDMA) engine 120, a SIS engine 120, an allocate and de-allocate engine 120, an XOR or sum of products (SOP) engine 120, a Serial Attach SCSI (SAS) engine 120, a set/update/clear/mirror footprint (S/U/C/M FP) engine 120, and a compression/decompression (COMP/DECOMP) engine 120.

In accordance with features of the invention, substantial conventional firmware function is moved to HW operations performed by the hardware engines 120. The hardware engines 120 are completely heterogeneous, and are fully extensible with chaining any engine to any other engine enabled.

As shown, controller semiconductor chip 102 includes a respective Peripheral Component Interconnect Express (PCIe) interface 128 with a PCIe high speed system interconnect between the controller semiconductor chip 102 and the processor complex 104, and a Serial Attach SCSI (SAS) controller 130 with a SAS high speed system interconnect between the controller semiconductor chip 102 and each of a plurality of storage devices 132, such as hard disk drives (HDDs) or spinning drives 132, and solid state drives (SSDs) 132. A host system 134 is connected to the controller 100 with a PCIe high speed system interconnect.

DS 112, for example, 8 GB of DRAM, stores volatile or non-volatile pages of Data, such as 4 KB page of Data or 8*528-bytes usable data or 64 CAS access (66-bytes), 32-byte cache line (CL) with one CL for each non-volatile page of the write cache in a contiguous area of DS and 32-byte parity update footprint (PUFP) in a contiguous area of DS after the CL area.

Figure 3B:
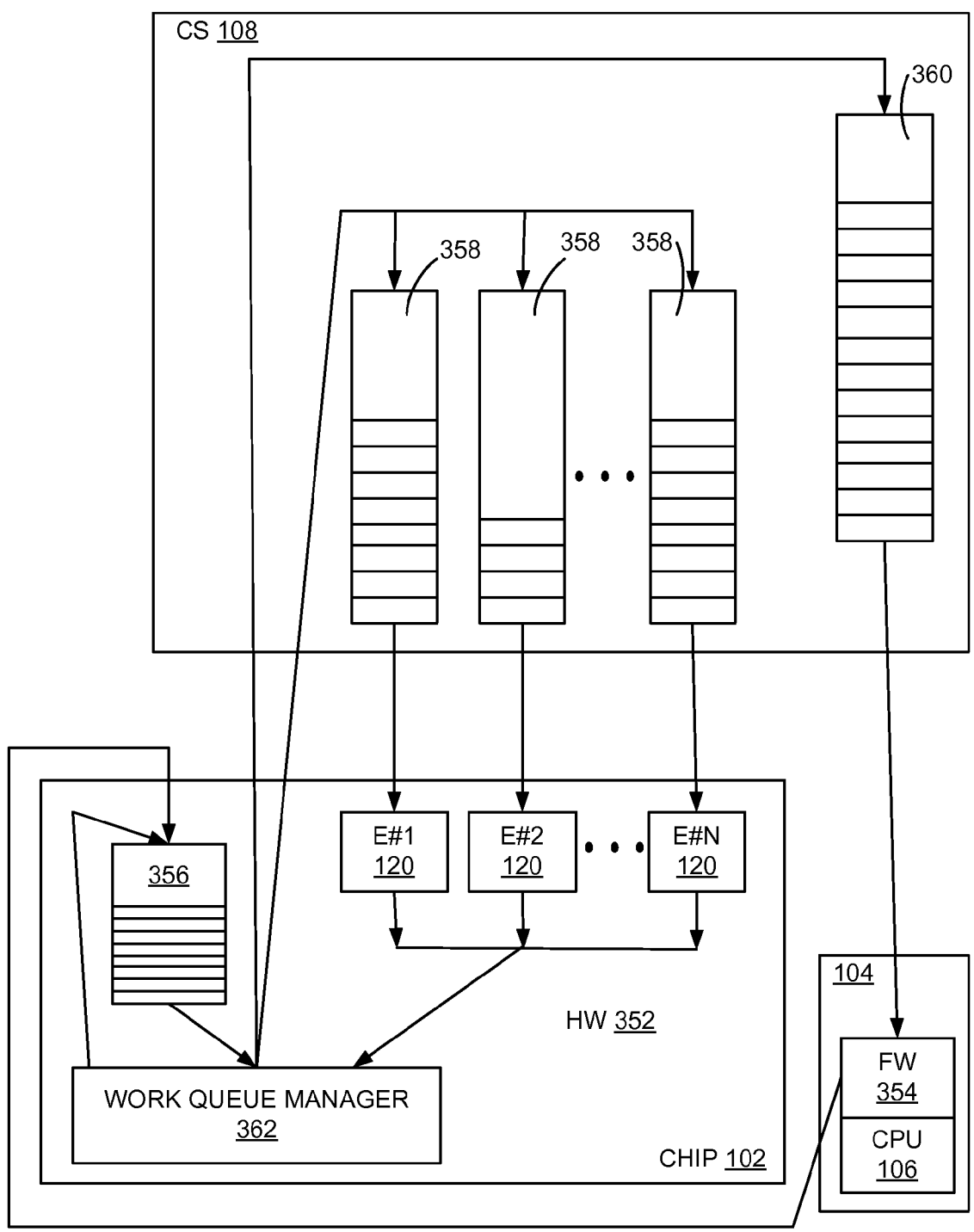
FIG. 3B illustrates an enhanced hardware (HW) and firmware (FW) interface including a plurality of example hardware (HW) Work Queues and a HW Event Queue stored in the control store (CS) in accordance with the preferred embodiment.

The control store (CS) 108 stores other structures and control blocks, such as illustrated and described with respect to FIGS. 3A and 3B, and FIGS. 4A and 4B. The control store (CS) 108 includes a control block (CB) buffer area, such as 8 MB size and 8 MB alignment, a HW Event Queue, such as 4 MB size and 4 MB alignment, providing 1M entries of 4 B each, SIS SEND Queue, such as 64 KB size and 64 KB alignment, providing 4K entries of 16 B each, Index Free List Volatile and Index Free List Non-Volatile, each such as 4 MB size and 4 MB alignment, providing 1M entries of 4 B each, HW Work Queues (WQ), such as 512 KB size and 512 KB alignment, providing 32 WQ of 16 KB each. Other structures in the CS 108 include Page Table Index Lists, such as 4 B, 1-N entries of 4 B each, which can be anywhere in the 256 MB space and are often within the 8 MB CS buffer area, CS target Buffers of 128 B alignment, where each buffer is 1 KB, and can be anywhere in the 256 MB space, and HW CB of 64 B alignment, which are within the 8 MB CS buffer area, such as illustrated in FIG. 3A.

Referring to FIG. 2A, there are shown example chained hardware operations minimizing hardware and firmware interactions in accordance with the preferred embodiment generally designated by the reference character 200. The chained hardware operations 200 include a chain 202 of a plurality of sequential operations by hardware (HW) 204 with an initial interaction with code or firmware (FW) 206 at the initial setup and another interaction with FW 208 at the completion of the series or chain 202 of operations by HW 204.

In accordance with features of the invention, the types of chained operations include Buffer Allocate, Buffer Deallocate, SAS Read-XOR, SAS Write, and Setting Parity Update Footprint (PUFP). Clearing PUFP, Mirrored write of a PUFP to a remote adapter, Mirrored write of cache data to remote adapter, and the like. For example, the following is an example of chained operations for a RAID-5 write: a) Buffer allocate, b) Read-XOR of data, c) Setting of PUFP, d) Write of data, e) Update parity footprint, f) Read-XOR of parity, g) Write of parity, h) Clearing of PUFP, and i) Buffer deallocate.

FIG. 2B illustrates conventional prior art storage adapter hardware and firmware interactions that includes a code or firmware (FW) and hardware interaction with each of multiple IOA operations. As shown in FIG. 2A, the chained hardware operations 200 of the invention, significantly reduces the firmware path length required for an I/O operation. The chained hardware operations 200 of the invention are arranged to minimize hardware/firmware interactions in order to maximize performance.

Referring to FIG. 3A, there is shown an example control store (CS) structure generally designated by the reference character 300 in accordance with the preferred embodiment. CS structure 300 includes predefined fields including an offset 302, size 304, and definition 306. CS structure 300 includes a plurality of sequential control blocks (HW CB) #1-17, 308, for example, which are selectively arranged in a predefined chain to minimize hardware and firmware interaction, such as to minimize the hardware engines 120 writing event queue entries to the processor complex 104.

In accordance with features of the invention, each predefined chain includes sequential control blocks 308 stored within contiguous memory in CS 108, as illustrated in FIG. 3A. Each predefined chain defines controls applied to respective hardware engines 120. Each control block 308 can be linked to any other control block 308 defining a predefined chain of operations. For example, each buffer in CS structure 300 is 2 KB in size. FW gives these buffers to HW by writing CS Indices to the Global Hardware (HW) Work Queue. HW returns to FW by writing to the HW Event Queue, as illustrated and described with respect to FIG. 3B.

Referring to FIG. 3B, there is shown an enhanced hardware (HW) and firmware (FW) interface generally designated by the reference character 350 in accordance with the preferred embodiment. The HW/FW interface 350 includes a HW block 352 including the plurality of HW engines 120 in the controller chip 102 and a firmware block 354 provided with the CPU 106 in the processor complex 104. The HW/FW interface 350 includes a global hardware (HW) Work Queue 356, such as a small embedded array in the controller chip 102. The global HW Work Queue 356 is coupled to each of a plurality of hardware (HW) Work Queues 358.

Each of the plurality of hardware (HW) Work Queues 358 is applied to respective hardware engines 1-N, 120 within the chip 102. A HW Event Queue 360 is coupled to firmware (FW) 354 providing completion results to the processor complex 104. A Work Queue Manager 362 in the controller chip 102 is coupled to each of the plurality of hardware (HW) Work Queues 358 and hardware engines 1-N, 120, and to the HW Event Queue 360. The global HW work queue 356 includes a queue input coupled to FW 354 in the processor complex 104 and a queue input coupled to the Work Queue Manager 362 in the controller chip 102. The Work Queue Manager 362 and the global HW work queue 356 provide an input to the HW Event Queue 360. The HW Work Queues 358, and the HW Event Queue 360 are stored in the control store (CS) 108.

The hardware engines 120 are arranged to DMA data from the host system 134 to the controller 100. The HDMA engine 120 DMAs the data from host system 134 to the CS 108 or DS 112, then notifies FW via the HW Event Queue 360. The hardware engines 120 are arranged to run some functions in parallel, such as 8 or 12 SAS engines 120, 4 host DMA engines 120, and the like. The hardware engines 120 are arranged to run multiple operations on different steps of the same function, such as an HDMA engine 120 fetches data from the host system 134 at the same time that another HDMA engine 120 is DMAing other data to the host system 134.

In accordance with features of the invention, each control block 308 includes a common header including a control block ID, a chain position, and a next control block ID. The control block chain position identifies a first in chain, a last in chain, middle in linked chain, or stand alone. The common header includes a predefined hardware event queue entry selectively written when the control block completes. The predefined hardware event queue entry is written when a stand alone control block completes and the last in chain control block completes. The predefined hardware event queue entry is written when control block fails with an error.

Referring also to FIG. 4A, there is shown an example common header generally designated by the reference character 400 of the control block 308 in accordance with the preferred embodiment. Each control block header 400 includes a byte 0, 402, for example, reserved or drive tag.

Each control block header 400 includes a byte 1, 404 including for example, a selective write HW Event Queue entry. The predefined hardware event queue entry 404 is selectively written when the control block completes. The predefined hardware event queue entry 404 is written when a stand alone control block completes or a last in chain control block completes. The predefined hardware event queue entry 404 is written when control block fails with an error.

Each control block header 400 includes a byte 2, 406 including an update HW Event Queue entry and a next control block engine identification (ID) 406. The HW Event Queue 360 shown in FIG. 3B is a circular first-in first-out (FIFO) in the CS 108. The HW Event Queue 360 is aligned on a 4M-byte address boundary, and is 4M-bytes in size. This size allows the queue to be a history of the last 1M events. HW writes 4-byte entries 406 to the HW Event Queue for each event. FW periodically reads and removes the entries from the HW Event Queue.

Each control block header 400 includes a byte 3, 408, including a control block engine ID and a chain position 408, and includes a header address (ADR) 410. The control block chain position 408 identifies a first in chain, a last in chain, middle in linked chain, or stand alone control block chain position.

Chained or stand alone CB execution begins when an entry is removed from the Global HW Work Queue 356 and dispatched by the Work Queue Manager 362 to one of the HW Work Queues 358 coupled to one of the Hardware Engines 120. Hardware Engines 120 in FIG. 3B can execute a chain of control blocks, HW CB #1-17, 308, as shown in FIG. 3A and further illustrated in FIGS. 4A, and 4B. The HW CB 308 links to the next operation in the predefined chain when the current engine 120 completes execution of its operation in the predefined chain. The mechanism for the next HW CB 308 in a respective predefined chain to eventually start execution is initiated by the respective hardware engine 120. The hardware engine 120 when completing execution of its HW CB 308 in the chain, adds 64 to its current CB address in CS 108, which then forms a new CB address in CS 108 that maps directly to the next 64 byte Offset 302 in the chain shown in FIG. 3A. This new CB address, together with the CB ID Next Linked field 406, is given to the Work Queue Manager 362 by hardware engine 120. The Work Queue Manager 362 then adds a new entry to Global HW WQ 356. The next CB in the predefined chain will then execute when this entry is removed from the Global HW WQ 356 and dispatched to one of the HW Work Queues 358.

Referring to FIG. 4B, there are shown a plurality of example control blocks in accordance with the preferred embodiment. The control blocks 308 include:
Set/Update/Clear/Mirror FP (Footprint)—F,
Set/Clear/Mirror CL—M,
Send SAS Op—S,
Free Allocated Pages—D,
Run SOP Engine—X,
Allocate Pages—A,
Send HDMA Op—H, and
Comp/Decompression—C.

With the Set/Update/Clear/Mirror FP (Footprint)—F control block 308, CS actions performed by HW or S/U/C/M FP engine 120 include for example, Read 32 Bytes from CS 108, for Set, for each 4K, Read 32 Bytes, Write 32 Bytes to DS 112 and Write 32 Bytes to NVRAM 114, and optionally mirror to remote controller; for Update, Read 32 Bytes from CS 108 or DS 112, Write 32 Bytes to DS 112 and Write 32 Bytes to NVRAM 114, and optionally mirror to remote controller; and for Clear, Write 32 Bytes to DS 112 and Write 32 Bytes to NVRAM 114, and optionally mirror to remote controller.

With the Set/Clear/Mirror CL—M control block 308, CS actions performed by HW or S/C/M CL engine 120 include for example, Read 32 Bytes from CS 108, for Set, for each 4K, Read 32 Bytes, Write 32 Bytes to DS 112 and For each 4K, Read 4 byte index, and may read 4K from DS 112 and optionally mirror to remote controller; and for Clear, For each 4K, Read 4 byte index, and Write 32 Bytes to DS 112 and optionally mirror to remote controller.

With the Send SAS Op—S control block 308 and the Send HDMA Op—H, CS actions performed by HW or the respective SAS engine 120 and the HDMA engine 120 include for example, For each 4K, SAS engine 120 and the HDMA engine 120 Read 4 byte index, and HDMA engine 120 will Read or Write 4K to DS 112, and SAS engine 120 may read and write 4K to DS 112. The HDMA engine 120 moves data between DS 112 and the host system 134, and the SAS engine 120 moves data between DS 112, and the storage devices 132.

With the Free Allocated Pages—D and the Allocate pages—A control blocks 308, CS actions performed by HW or the Alloc/Dealloc engine 120 include for example, for each 4K, Read 4 Bytes, and Write 4 Bytes.

With the Run SOP Engine—X control block 308, CS actions performed by HW or the XOR engine 120 include for example, For each 4K of Source (for each source), Read 4 Bytes, and Read 4K of DS 112; and For each 4K of Destination (for each destination), Read 4 Bytes, and Write 4K of DS 112. The sum-of-products (SOP) engine 120 takes an input of 0-N source page lists and 0-M destination page lists as well as an N×M array of multipliers. For example, N=18 and M=2. For each 4K, the first source page is read from DRAM and the first set of M multipliers are applied to each byte. The resulting data is put into M on chip accumulation buffers. Each subsequent source page is multiplied by its associated M multipliers and the product XORed with the corresponding accumulation buffers. When every source has been processed, the accumulation buffers are written out to the corresponding M destination buffers. Then, the next 4K is started. This allows computing an N input XOR to compute RAID-5 parity or N input multiply XOR of M equations simultaneously for Reed-Solomon based RAID-6 P & Q redundancy data.

With the Comp/Decompression—C control block 308, CS actions performed by HW or the Comp/Decomp engine 120 include for example, For each logical 4K (compressed data may be <4K), Read 4 Bytes, and Read 4K of DS 112 (or less if doing decompression), Read 4 Bytes, and Write 4K of DS 112 (or less if doing compression), and optionally other operations may be performed.

Figure 5A:
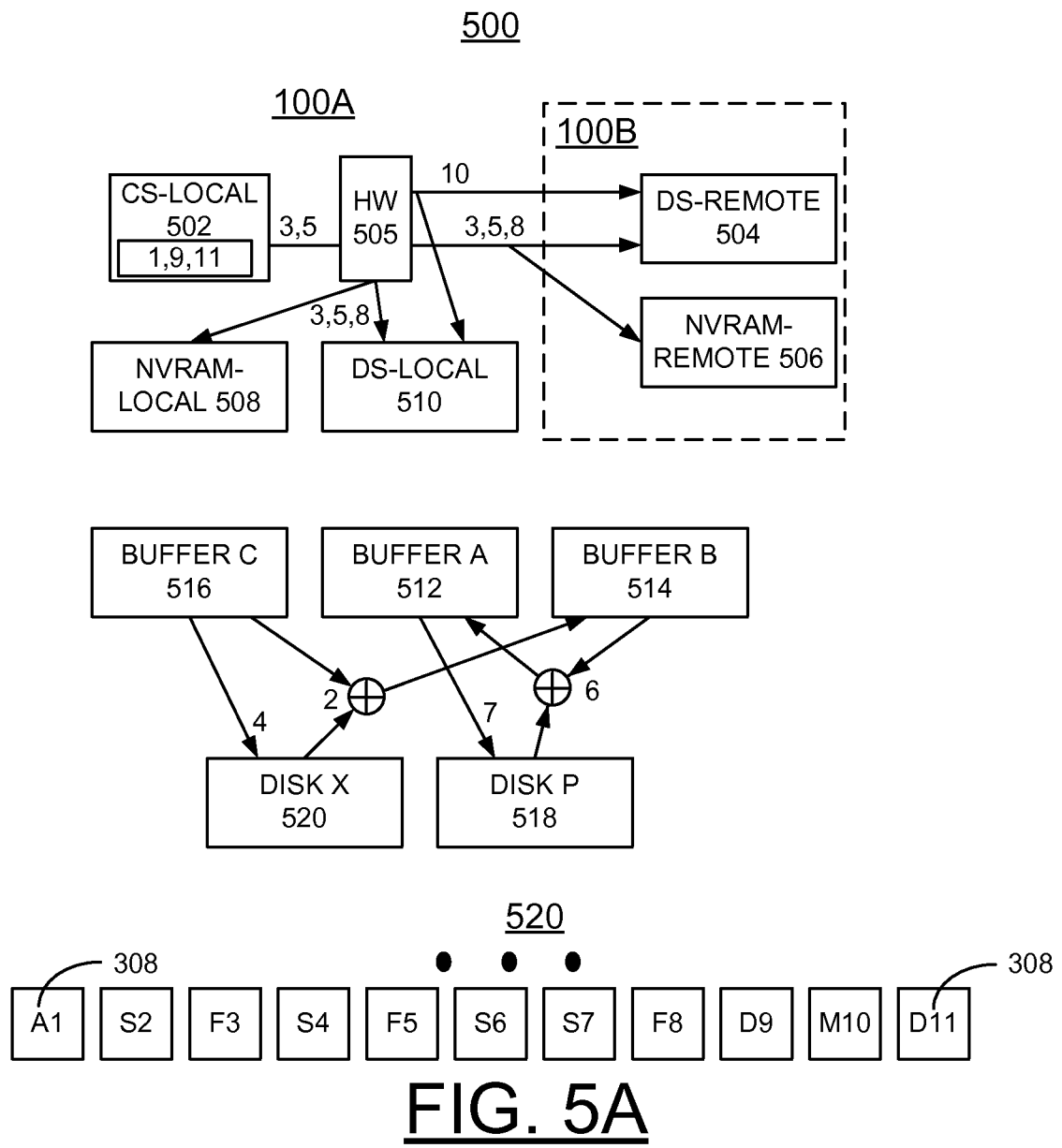
FIGS. 5A and 5B are hardware logic operations flow and flow chart illustrating exemplary operations performed by a predefined chain of a plurality of the control blocks selectively arranged to implement an example RAID-5 normal parity update in accordance with the preferred embodiment.

A respective example chain of control blocks 308 is illustrated and described with respect to FIG. 5A in accordance with the preferred embodiment.

Figure 5B:
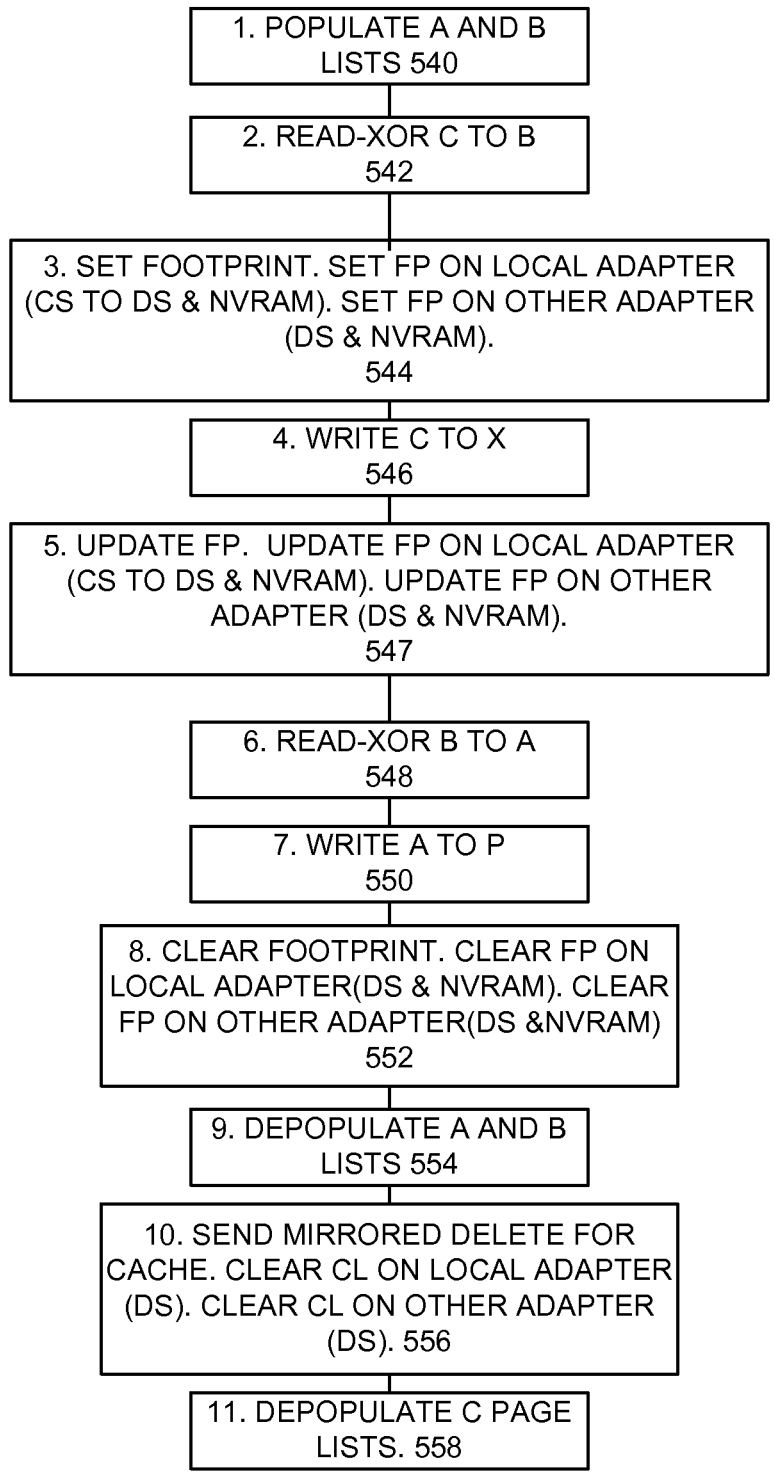

Referring to FIGS. 5A and 5B, there are shown hardware logic operations flow generally designated by the reference character 500 and a flow chart in FIG. 5B illustrating exemplary operations performed by a predefined chain generally designated by the reference character 520 of a plurality of the control blocks selectively arranged to implement an example RAID-5 normal parity update in accordance with the preferred embodiment. In FIG. 5A, the chain 520 of control block 308 include control blocks A1, S2, F3, S4, F5, S6, S7, F8, D9, M10, and D11, as defined in FIG. 4B together with the respective steps 1-11 shown in FIGS. 5A and 5B.

FIG. 5A includes a local CS 502 of a first or local controller 100A coupled by a HW engine 505 to a remote DS 504 and to a remote NVRAM 506 of a second or remote controller 100B. The local CS 502 is coupled by the HW engine 505 to a local NVRAM 508, and a local DS 510 of the first controller 100A. A plurality of buffers of a first controller 100A including buffer A, 512, buffer B, 514, and buffer C, 516, are coupled to a disk P 518 and a disk X 520.

In step 1, A and B lists for Buffer A, 512, and Buffer B, 514 are allocated or populated at control block A1 of chain 520, in CS local 502 in FIG. 5A, and as indicated at a block 540 in FIG. 5B. Next in Step 2, Data is read from Disk X 520, and XORed with Buffer C, 516 and the result is placed in Buffer B, 514 at control block S2 of chain 520, at 2 XOR in FIG. 5A, and as indicated at a block 542 in FIG. 5B. In step 3, set footprint is performed at control block F3 of chain 520, read by HW engine 505, line 3 from HW engine 505 to DS 510 and NVRAM 508 on the local controller 100A and set footprint on the remote controller 100B from HW engine 505 to DS 504 and NVRAM 506 in FIG. 5A, and as indicated at a block 544 in FIG. 5B.

In step 4, Write data from Buffer C, 516 to Disk X 520 is performed at control block S4 of chain 520, line 4 from Buffer C, 516 to Disk X 520 in FIG. 5A, and as indicated at a block 546 in FIG. 5B. Next in Step 5, update footprint is performed at control block F5 of chain 520, read by HW engine 505, line 5 from HW engine 505 to DS 510 and NVRAM 508 on the local controller 100A and update footprint on the remote controller 100B from HW engine 505 to DS 504 and NVRAM 506 in FIG. 5A, and as indicated at a block 547 in FIG. 5B. Next in Step 6, Data is read from Disk P 518, and XORed with Buffer B, 514 and the result is placed in Buffer A, 512 at control block S6 of chain 520, at 6 XOR in FIG. 5A, and as indicated at a block 548 in FIG. 5B. Next in Step 7, Write data from Buffer A, 512 to Disk P 518 is performed at control block S7 of chain 520, at line 7 from Buffer A, 512 to Disk P 518 in FIG. 5A, and as indicated at a block 550 in FIG. 5B.

In step 8, Clear footprint is performed by HW engine 505 writing zeros at control block F8 of chain 520, at line 8 from HW engine 505 to NVRAM 508 and the DS 510 on the local controller 100A and clear footprint on the remote controller 100B at line 8 from HW engine 505 to DS 504 and NVRAM 506 in FIG. 5A, and as indicated at a block 552 in FIG. 5B. In step 9, A and B lists for Buffer A, 512, and Buffer B, 514 are deallocated or depopulated at control block D9 of chain 520, at CS local 502 in FIG. 5A, and as indicated at a block 554 in FIG. 5B. In step 10, Send mirrored delete for cache by HW engine 505 writing zeros to clear CL on local DS 510 and to clear CL on remote DS 504 at control block M10 of chain 520, indicated at line 10 from HW engine 505 to local DS 510 and to remote DS 504 in FIG. 5A, and as indicated at a block 556 in FIG. 5B. In step 11, Page lists for Buffer C, 516 are de-allocated or depopulated at control block D11 of chain 520, at CS local 502 in FIG. 5A, and as indicated at a block 558 in FIG. 5B.

Figure 6A:
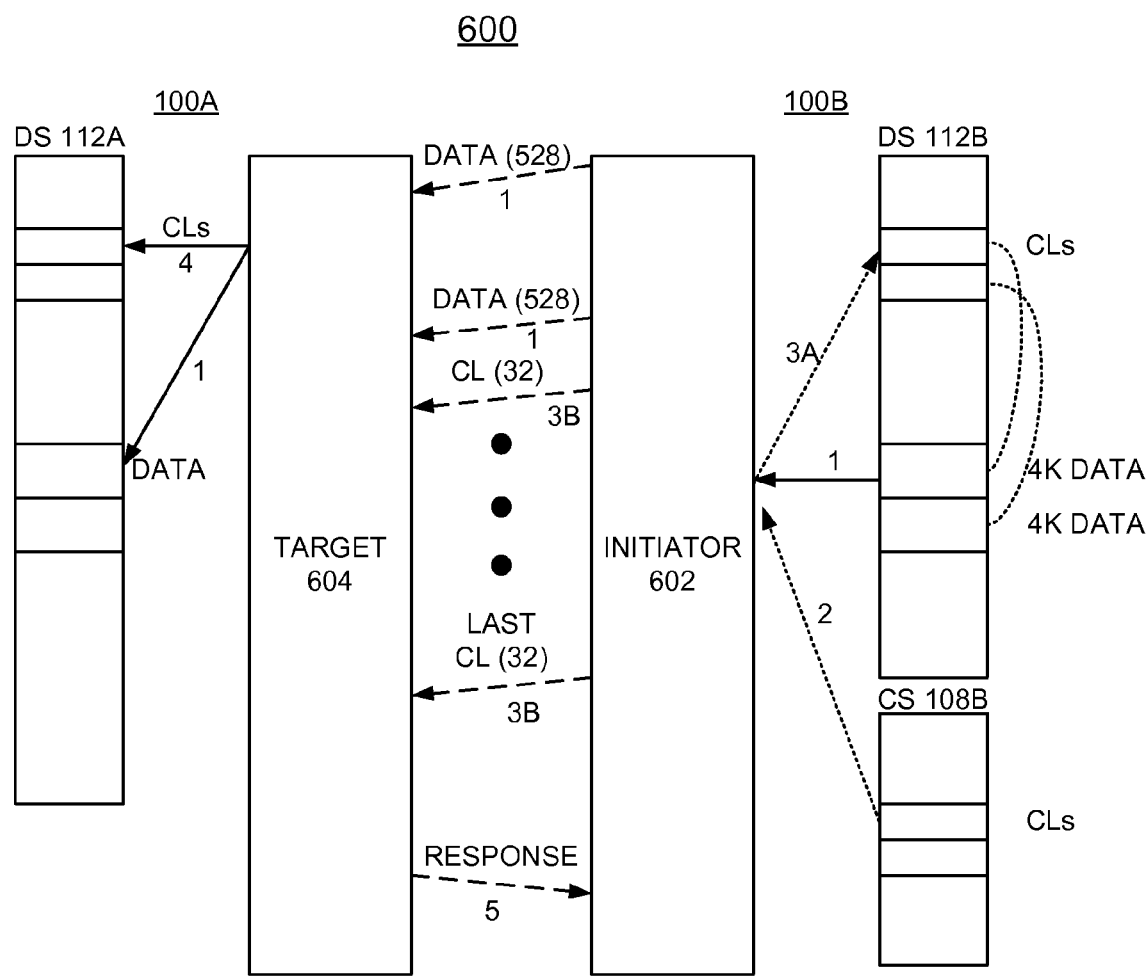
FIGS. 6A and 6B are hardware logic operations flow and flow chart illustrating exemplary operations for cache data and cache directory write mirroring between dual adapters in accordance with the preferred embodiment.
Figure 6B:
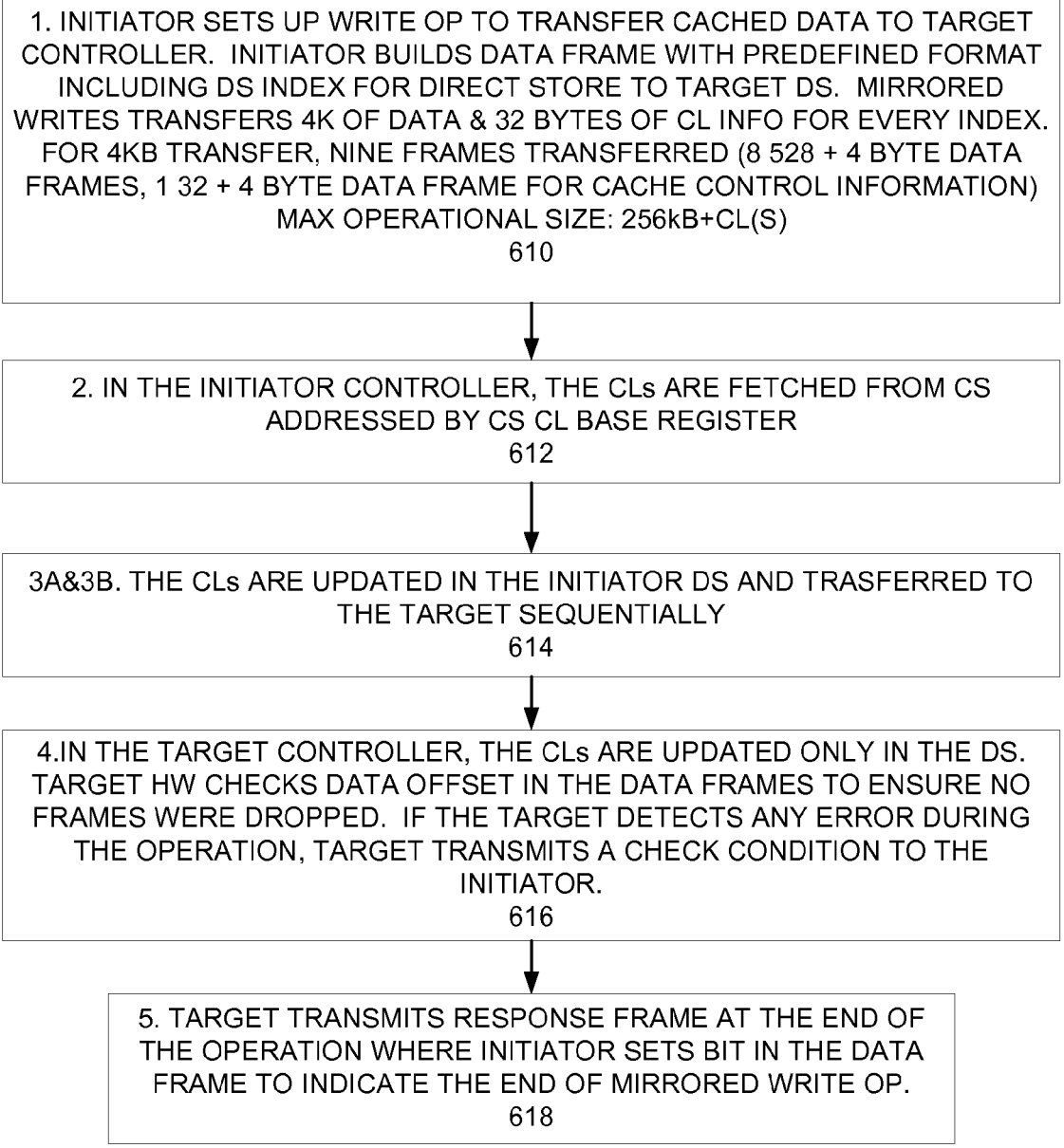

Referring to FIGS. 6A and 6B, there are shown hardware logic operations flow generally designated by the reference character 600 and a flow chart in FIG. 6B illustrating exemplary operations for cache data and cache directory write mirroring between dual adapters or controllers 100 in accordance with the preferred embodiment.

FIG. 6A illustrates hardware logic operations flow 600 between a first controller 100A and a second controller 100B. As shown, the second controller 100B includes an initiator 602 for a mirrored write to a target 602 in the first controller 100A. Firmware (FW) in the second controller 100B sets up the initiator 602, an Initiator Write op, to transfer cache data to the first controller 100A. Each of the first controller 110A and the second controller 110B includes a plurality of hardware engines 120, control store (CS) 108 configured to store the cache lines (CLs) for each page index and data store 112 configured to store data and respective cache line (CL) for each page index, as shown in FIG. 1.

In accordance with features of the invention, the second controller 100B operates in the first initiator mode includes firmware (FW) to set up an initiator write operation building a data frame for transferring data and a respective cache line (CL) for each page index to the first controller 100A operating in the second target mode. Respective initiator hardware engines 120 transfers data, reading CLs from the initiator control store 108B, and writing updated CLs to the initiator data store 112B, and simultaneously sending data and updated CLs to the first controller 100A. Respective target hardware engines 120 write data and updated CLs to the target data store 112A, eliminating firmware operations of the first controller 100A operating in the second target mode.

Referring also to FIG. 6B, as indicated at a block 610, firmware in controller 100B sets up an Initiator Write op 610. The initiator 602 builds the Data frame with a predefined format including a data store (DS) index allowing direct store in DS 110A, for example, with a Data payload size for each frame of 528/32 of data and 4 bytes of control information for the target 602. For example, the mirrored Writes transfer 4K of data from the DS 112, as indicated at line 1 from DS 112B via the initiator 602 to the target 602 in FIG. 6A. For every 4 KB transfer there are nine frames transferred (eight 528+4 byte data frames and one 32+4 byte data frame for cache control information).

As indicated at a block 612, in controller 100B, CLs are fetched from CS 108B addressed by a CS CL base address register, as indicated at line 2 from CS 108B to the initiator 602 in FIG. 6A. As indicated at a block 614, the CLs are updated, indicated at line 3A in FIG. 6A, writing updated CLs to the initiator data store 112B and then sending updated CLs to the first controller 100A, indicated at lines 3B from the initiator 602 to the target 604 in the first controller 100A in FIG. 6A.

As indicated at a block 616, in the target controller 100A, data and CLs are written to the DS 112A, lines 1 and 4 from the target 604 to the DS 112A in FIG. 6A. CLs are updated only in data store 112B. Hardware in the target controller 100A checks a data offset in the data frames to ensure no frames were dropped. If the target controller 100A detects any error during the operation, the target controller transmits a check condition to the initiator controller 100B.

As indicated at a block 618, and line 5 from the target 604 to the initiator 602 in FIG. 6A, the target transmits a response frame at the end of the operation where the initiator sets a bit in the data frame to indicate the end of mirrored write op.

Figure 7A:
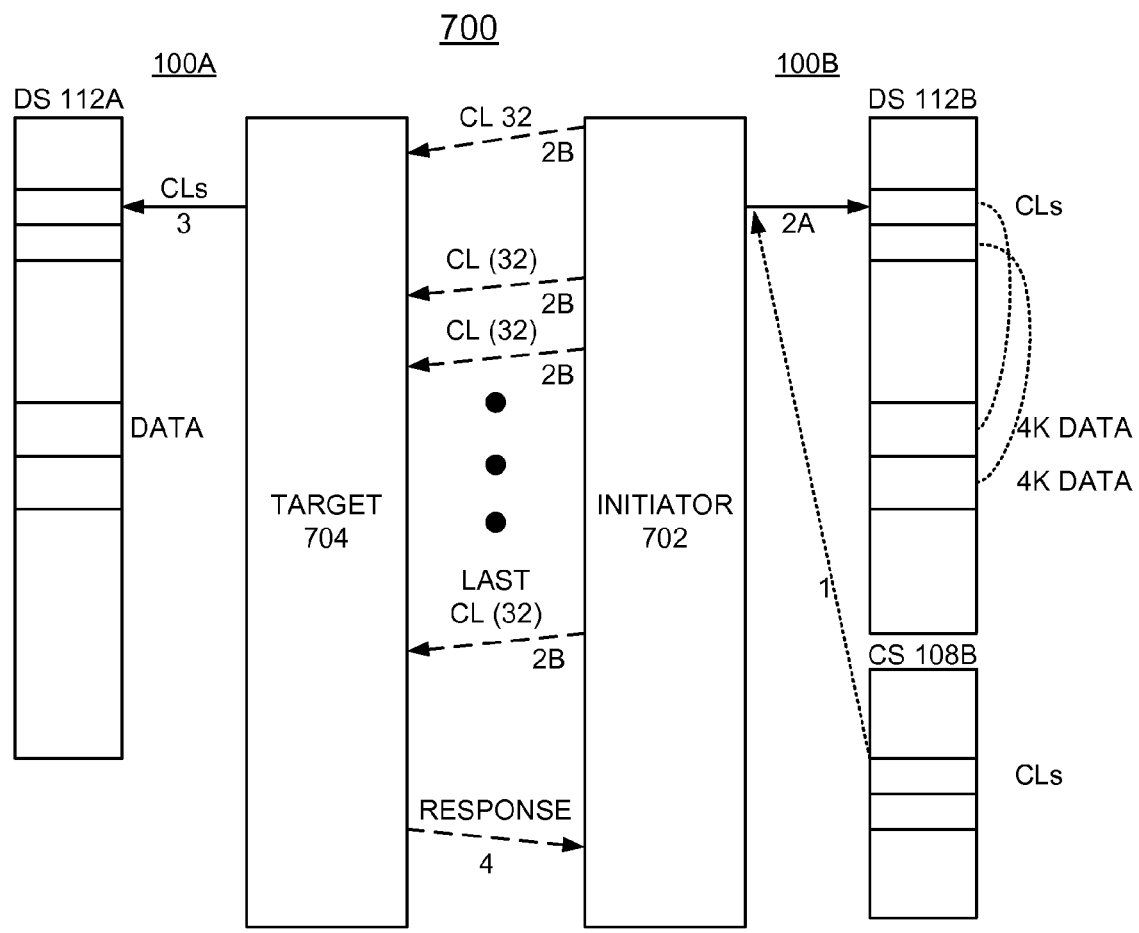
FIGS. 7A and 7B are hardware logic operations flow and flow chart illustrating exemplary operations for cache data and cache directory delete mirroring between dual adapters in accordance with the preferred embodiment.
Figure 7B:
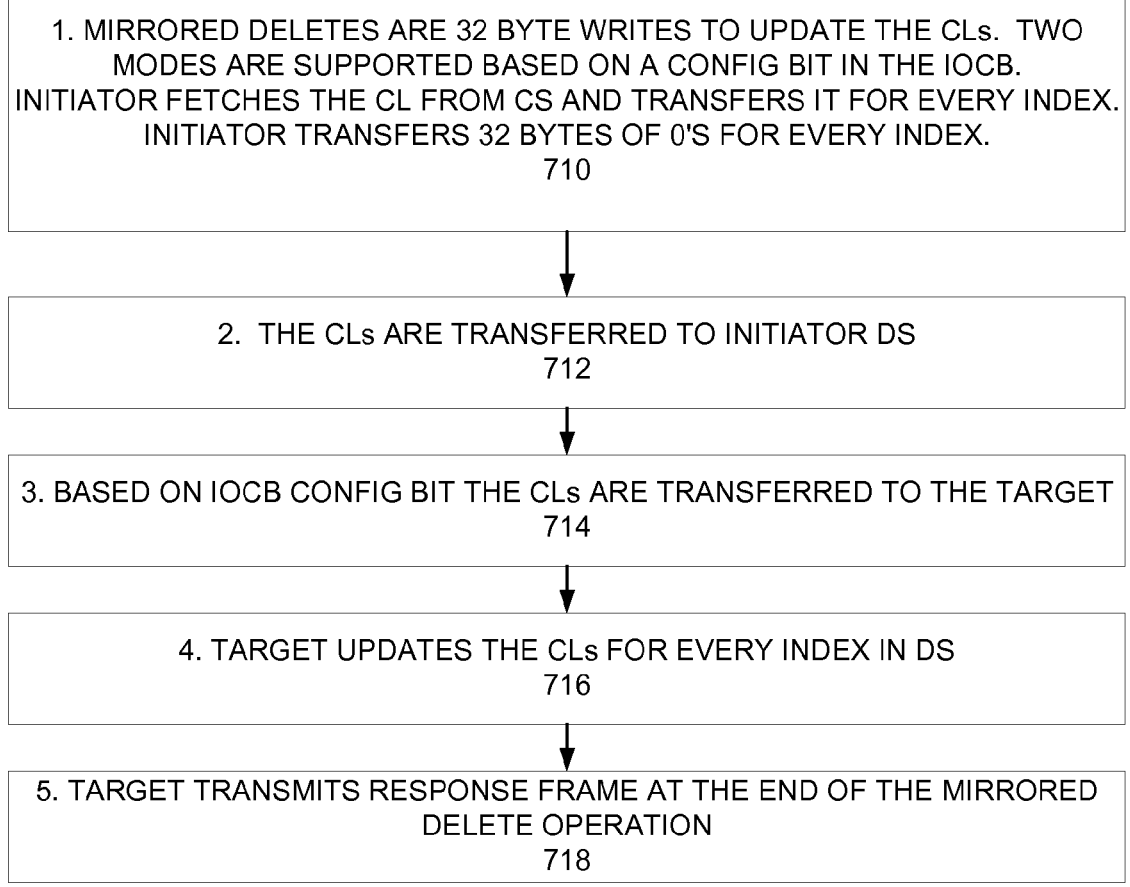

Referring to FIGS. 7A and 7B, there are shown hardware logic operations flow generally designated by the reference character 700 and a flow chart in FIG. 7B illustrating exemplary operations for cache data and cache directory delete mirroring between dual adapters or controllers 100 in accordance with the preferred embodiment.

FIG. 7A illustrates hardware logic operations flow 700 between a first controller 100A and a second controller 100B. As shown, the second controller 100B includes an initiator 702 for a mirrored delete to a target 702 in the first controller 100A. Firmware (FW) in the second controller 100B sets up the initiator 702, an Initiator mirrored Delete op, to write mirrored deletes to update the CLs.

Referring also to FIG. 7B, as indicated at a block 710, mirrored deletes are 32 byte writes to update the CLs. Two modes are supported based upon a configuration bit in an IO control block (IOCB). For example, the initiator 702 fetches the CL from CS 702, as indicated at line 1 from the CS 108B to the initiator 702 in FIG. 7A. As indicated at a block 712, the CLs are transferred to the initiator DS 112B, as indicated at line 2A from the initiator 702 to the DS 112B in FIG. 7A. As indicated at a block 714, based upon the IOCB configuration bit, the CLs are simultaneously transferred to the target 704, as indicated at lines 2B from the initiator 702 to the target 704 in FIG. 7A. The target 704 updates the CLs for every index in the DS 112A, as indicated at line 3 from the target 704 to the DS 112A in FIG. 7A. As indicated at a block 718, and line 4 from the target 704 to the initiator 702 in FIG. 7A, the target transmits a response frame at the end of the operation.

Figure 8:
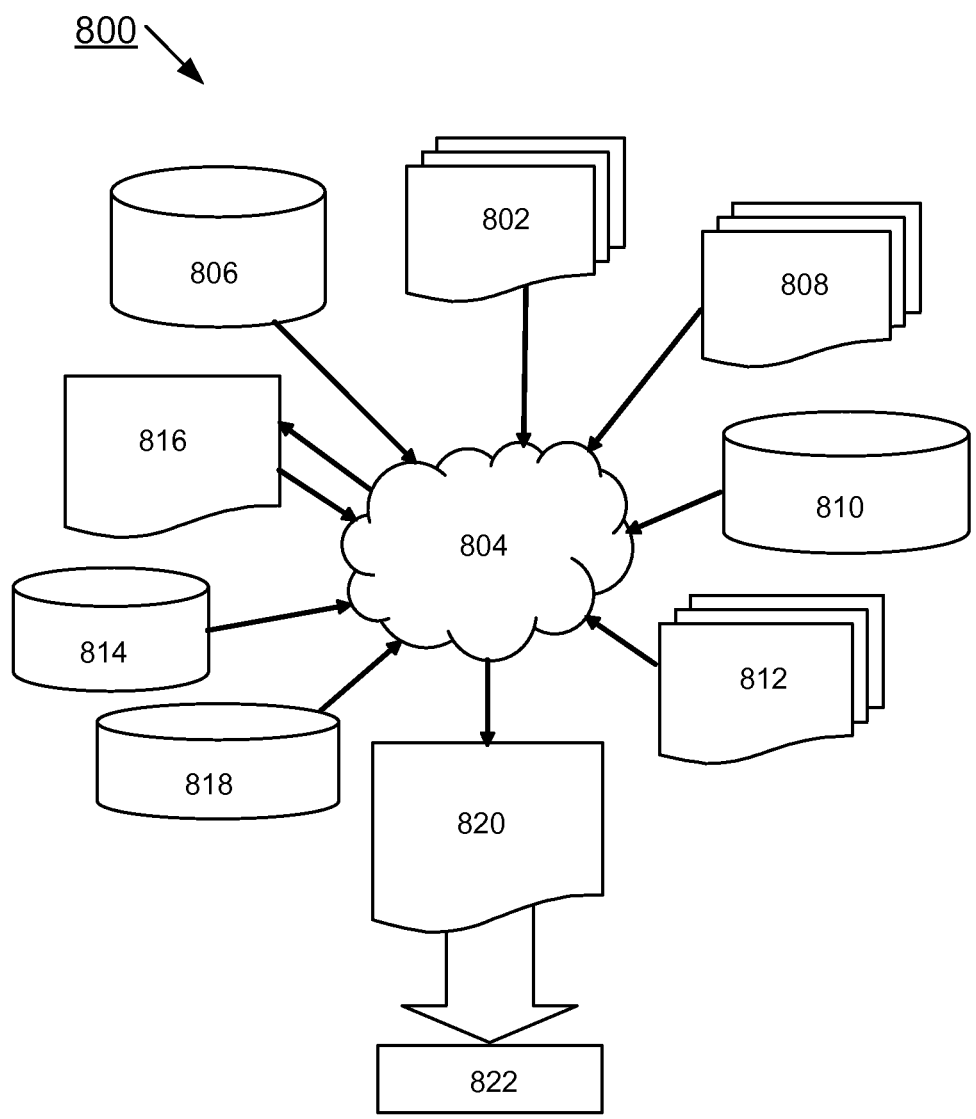
FIG. 8 is a flow diagram of a design process used in semiconductor design, manufacturing, and/or test.

FIG. 8 shows a block diagram of an example design flow 800. Design flow 800 may vary depending on the type of IC being designed. For example, a design flow 800 for building an application specific IC (ASIC) may differ from a design flow 800 for designing a standard component. Design structure 802 is preferably an input to a design process 804 and may come from an IP provider, a core developer, or other design company or may be generated by the operator of the design flow, or from other sources. Design structure 802 comprises circuits 100, 200, 300, 308, 350, 400, 500, 600, 700 in the form of schematics or HDL, a hardware-description language, for example, Verilog, VHDL, C, and the like. Design structure 802 may be contained on one or more machine readable medium. For example, design structure 802 may be a text file or a graphical representation of circuits 100, 200, 300, 308, 350, 400, 500, 600, 700. Design process 804 preferably synthesizes, or translates, circuit 100 into a netlist 806, where netlist 806 is, for example, a list of wires, transistors, logic gates, control circuits, I/O, models, etc. that describes the connections to other elements and circuits in an integrated circuit design and recorded on at least one of machine readable medium. This may be an iterative process in which netlist 806 is resynthesized one or more times depending on design specifications and parameters for the circuit.

Design process 804 may include using a variety of inputs; for example, inputs from library elements 808 which may house a set of commonly used elements, circuits, and devices, including models, layouts, and symbolic representations, for a given manufacturing technology, such as different technology nodes, 32 nm, 45 nm, 90 nm, and the like, design specifications 810, characterization data 812, verification data 814, design rules 816, and test data files 818, which may include test patterns and other testing information. Design process 804 may further include, for example, standard circuit design processes such as timing analysis, verification, design rule checking, place and route operations, and the like. One of ordinary skill in the art of integrated circuit design can appreciate the extent of possible electronic design automation tools and applications used in design process 804 without deviating from the scope and spirit of the invention. The design structure of the invention is not limited to any specific design flow.

Design process 804 preferably translates an embodiment of the invention as shown in FIGS. 1, 2A, 3A, 3B, 4A, 4B, 5A, 5B, 6A, 6B, 7A and 7B along with any additional integrated circuit design or data (if applicable), into a second design structure 820. Design structure 820 resides on a storage medium in a data format used for the exchange of layout data of integrated circuits, for example, information stored in a GDSII (GDS2), GL1, OASIS, or any other suitable format for storing such design structures. Design structure 820 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2A, 3A, 3B, 4A, 4B, 5A, 5B, 6A, 6B, 7A and 7B. Design structure 820 may then proceed to a stage 822 where, for example, design structure 820 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A data storage system comprising:
 a first controller and a second controller, each of the first controller and the second controller comprising a plurality of hardware engines;
 a control store configured to store cache lines (CLs) for each page index;
 a data store configured to store data and a respective cache line (CL) for each page index;
 one of the first controller or the second controller operating in a first initiator mode, firmware sets up an initiator write operation, building a data frame for transferring data and a respective cache line (CL) for each page index to the other of the first controller or the second controller operating in a second target mode;
 respective initiator hardware engines transferring data, reading CLs from the initiator control store, and writing updated CLs to the initiator data store, and simultaneously sending data and updated CLs to the other of the first controller or the second controller;
 respective target hardware engines writing data and updated CLs to the target data store, eliminating firmware operations.

2. The data storage system as recited in claim 1 wherein said respective target hardware engines write data and updated CLs to the target data store using a data store index specified in the data frame.

3. The data storage system as recited in claim 1 wherein said target hardware engines check a data offset in the data frames to detect dropped frames.

4. The data storage system as recited in claim 1 wherein said controller operating in the second target mode transmits a check condition to the controller operating in the first initiator mode, responsive to said controller detecting any error during a mirrored write operation.

5. The data storage system as recited in claim 1 wherein said controller operating in the first initiator mode sets a bit in the data frame to indicate the end of a mirrored write operation.

6. The data storage system as recited in claim 1 wherein said controller operating in the second target mode transmits a response frame at the end of a mirrored write operation.

7. The data storage system as recited in claim 1 wherein said data store includes a dynamic random access memory (DRAM) storing volatile or non-volatile pages of data and said respective cache line (CL) with one CL for each non-volatile page of a write cache stored in a contiguous area of said data store.

8. The data storage system as recited in claim 1 wherein said control store includes a dynamic random access memory (DRAM).

9. A method for implementing storage adapter performance optimization in a data storage system comprising:
 providing a first controller and a second controller,
 providing each of the first controller and the second controller comprising a plurality of hardware engines; a control store configured to store cache lines (CLs) for each page index; and a data store configured to store data and a respective cache line (CL) for each page index;
 operating one of the first controller or the second controller in a first initiator mode and using firmware to set up an initiator write operation, building a data frame for transferring data and a respective cache line (CL) for each page index to the other of the first controller or the second controller operating in a second target mode;
 respective initiator hardware engines, transferring data, reading CLs from the initiator control store, and writing updated CLs to the initiator data store, and simultaneously sending data and updated CLs to the other of the first controller or the second controller; and
 respective target hardware engines, writing data and updated CLs to a target data store, eliminating firmware operations.

10. The method as recited in claim 9 wherein said respective target hardware engines, writing data and updated CLs to the target data store includes said respective target hardware engines writing data and updated CLs to the target data store using a data store index specified in the data frame.

11. The method as recited in claim 9 wherein said respective target hardware engines, writing data and updated CLs to the target data store includes said target hardware engines, checking a data offset in the data frames to detect dropped frames.

12. The data storage system as recited in claim 9 wherein said controller operating in the second target mode transmits a check condition to the controller operating in the first initiator mode, responsive to said controller detecting any error during a mirrored write operation.

13. The data storage system as recited in claim 9 wherein said controller operating in the first initiator mode sets a bit in the data frame to indicate the end of a mirrored write operation.

14. The data storage system as recited in claim 9 wherein said controller operating in the second target mode transmits a response frame at the end of a mirrored write operation.

15. The method as recited in claim 9 wherein said data store includes a dynamic random access memory (DRAM) storing volatile or non-volatile pages of data and said respective cache line (CL) with one CL for each non-volatile page of a write cache stored in a contiguous area of said data store.

* * * * *